(12) United States Patent
DeMello et al.

(10) Patent No.: US 7,260,781 B2
(45) Date of Patent: *Aug. 21, 2007

(54) SYSTEM, METHOD AND USER INTERFACE FOR ACTIVE READING OF ELECTRONIC CONTENT

(75) Inventors: Marco A. DeMello, Redmond, WA (US); Vikram Madan, Bellevue, WA (US); Leroy B. Keely, Portola Valley, CA (US); David M. Silver, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

This patent is subject to a terminal disclaimer.

(21) Appl. No.: 10/460,226

(22) Filed: Jun. 13, 2003

(65) Prior Publication Data

US 2003/0206189 A1 Nov. 6, 2003

Related U.S. Application Data

(62) Division of application No. 09/455,808, filed on Dec. 7, 1999, now Pat. No. 6,714,214.

(51) Int. Cl.
*G09G 5/00* (2006.01)
*G06F 13/00* (2006.01)

(52) U.S. Cl. ..................... 715/711; 715/841

(58) Field of Classification Search ............... 715/808, 715/840, 817, 788, 864, 711–714, 814–816, 715/821–824, 856, 841–844; 707/512–513
See application file for complete search history.

(56) References Cited

U.S. PATENT DOCUMENTS

| 5,146,552 A | 9/1992 | Cassorla et al. |
| 5,239,466 A | 8/1993 | Morgan et al. |
| RE34,476 E | 12/1993 | Norwood |
| 5,347,295 A | 9/1994 | Agulnick et al. |
| 5,390,138 A | 2/1995 | Milne et al. |
| 5,434,965 A | 7/1995 | Matheny et al. |
| 5,471,568 A | 11/1995 | Webb et al. |
| 5,572,643 A | 11/1996 | Judson |
| 5,623,679 A | 4/1997 | Rivette et al. |

(Continued)

FOREIGN PATENT DOCUMENTS

EP 0342838 A 11/1989

(Continued)

OTHER PUBLICATIONS

Schilit et al., "Digital Library Information Appliances", pp. 217-225, 1998.

(Continued)

*Primary Examiner*—Cao (Kevin) Nguyen
(74) *Attorney, Agent, or Firm*—Banner & Witcoff, Ltd.

(57) ABSTRACT

A system, method, and user interface for interacting with electronically displayed content is disclosed. In response to a selection of an object, a list of menu options is displayed close to the selected object. In one embodiment, the list of menu options is displayed in a font larger than that used to display the selected object. Through the use of the invention, a user is provided with a technique for actively reading displayed content with minimal distractions from the user interface.

10 Claims, 8 Drawing Sheets

U.S. PATENT DOCUMENTS

| | | | |
|---|---|---|---|
| 5,625,833 A | 4/1997 | Levine et al. |
| 5,630,125 A | 5/1997 | Zellweger |
| 5,632,022 A | 5/1997 | Warren et al. |
| 5,644,674 A | 7/1997 | Aihara et al. |
| 5,680,636 A | 10/1997 | Levine et al. |
| 5,682,439 A | 10/1997 | Beernink et al. |
| 5,687,331 A | 11/1997 | Volk et al. |
| 5,689,717 A | 11/1997 | Pritt |
| 5,717,879 A | 2/1998 | Moran et al. |
| 5,719,595 A | 2/1998 | Hoddie et al. |
| 5,727,129 A | 3/1998 | Barrett et al. |
| 5,729,687 A | 3/1998 | Rothrock et al. |
| 5,737,599 A | 4/1998 | Rowe et al. |
| 5,745,116 A | 4/1998 | Pisutha-Arnond |
| 5,760,773 A | 6/1998 | Berman et al. |
| 5,761,485 A | 6/1998 | Munyan |
| 5,784,058 A | 7/1998 | LaStrange et al. |
| 5,790,818 A | 8/1998 | Martin |
| 5,801,685 A | 9/1998 | Miller et al. |
| 5,801,687 A | 9/1998 | Peterson et al. |
| 5,821,925 A | 10/1998 | Carey et al. |
| 5,822,720 A | 10/1998 | Bookman et al. |
| 5,826,025 A | 10/1998 | Gramlich |
| 5,832,263 A | 11/1998 | Hansen et al. |
| 5,838,313 A | 11/1998 | Hou et al. |
| 5,838,914 A | 11/1998 | Carleton et al. |
| 5,845,262 A | 12/1998 | Nozue et al. |
| 5,862,395 A | 1/1999 | Bier |
| 5,877,757 A | 3/1999 | Baldwin et al. |
| 5,893,126 A | 4/1999 | Drews et al. |
| 5,893,132 A | 4/1999 | Huffman et al. |
| 5,918,236 A | 6/1999 | Wical |
| 5,920,694 A | 7/1999 | Carleton et al. |
| 5,931,912 A | 8/1999 | Wu et al. |
| 5,933,139 A | 8/1999 | Feigner et al. |
| 5,933,140 A | 8/1999 | Strahorn et al. |
| 5,937,416 A | 8/1999 | Menzel |
| 5,940,080 A | 8/1999 | Ruehle et al. |
| 5,948,040 A | 9/1999 | DeLorme et al. |
| 5,950,214 A | 9/1999 | Rivette et al. |
| 5,956,048 A * | 9/1999 | Gaston ........................ 345/530 |
| 5,978,818 A | 11/1999 | Lin |
| 5,982,370 A | 11/1999 | Kamper |
| 5,983,248 A | 11/1999 | DeRose et al. |
| 5,986,665 A | 11/1999 | Wrey et al. |
| 6,011,537 A | 1/2000 | Slotznick |
| 6,012,055 A | 1/2000 | Campbell et al. |
| 6,018,334 A | 1/2000 | Eckerberg et al. |
| 6,018,342 A | 1/2000 | Bristor |
| 6,018,742 A | 1/2000 | Herbert, III |
| 6,035,330 A | 3/2000 | Astiz et al. |
| 6,038,598 A | 3/2000 | Danneels |
| 6,049,812 A | 4/2000 | Bertram et al. |
| 6,052,514 A | 4/2000 | Gill et al. |
| 6,054,990 A | 4/2000 | Tran |
| 6,055,538 A | 4/2000 | Kessenich et al. |
| 6,064,384 A | 5/2000 | Ho |
| 6,076,917 A | 6/2000 | Wen |
| 6,081,829 A | 6/2000 | Sidana |
| 6,091,930 A | 7/2000 | Mortimer et al. |
| 6,094,147 A | 7/2000 | Baxton et al. |
| 6,094,197 A | 7/2000 | Buxton et al. |
| 6,122,649 A | 9/2000 | Kanerva et al. |
| 6,133,925 A | 10/2000 | Jaremko et al. |
| 6,144,375 A | 11/2000 | Jain et al. |
| 6,144,991 A | 11/2000 | England |
| 6,154,771 A | 11/2000 | Rangan et al. |
| 6,157,381 A | 12/2000 | Bates et al. |
| 6,163,778 A | 12/2000 | Fogg et al. |
| 6,181,344 B1 | 1/2001 | Tarpenning et al. |
| 6,181,399 B1 | 1/2001 | Tarpenning et al. |
| 6,184,886 B1 | 2/2001 | Bates et al. |
| 6,195,679 B1 | 2/2001 | Bauersfeld et al. |
| 6,195,694 B1 | 2/2001 | Chen et al. |
| 6,199,082 B1 | 3/2001 | Ferrel et al. |
| 6,205,419 B1 | 3/2001 | Fielder |
| 6,205,455 B1 | 3/2001 | Umen et al. |
| 6,211,871 B1 | 4/2001 | Himmel et al. |
| 6,226,655 B1 | 5/2001 | Borman et al. |
| 6,230,171 B1 | 5/2001 | Pacifici et al. |
| 6,266,772 B1 | 7/2001 | Suzuki |
| 6,271,840 B1 | 8/2001 | Finseth et al. |
| 6,272,484 B1 | 8/2001 | Martin et al. |
| 6,276,005 B1 | 8/2001 | Zelkweger |
| 6,279,014 B1 | 8/2001 | Schilit et al. |
| 6,289,126 B1 | 9/2001 | Ishisaka |
| 6,289,362 B1 | 9/2001 | Van Der Meer |
| 6,301,590 B1 | 10/2001 | Siow et al. |
| 6,320,577 B1 | 11/2001 | Alexander |
| 6,321,244 B1 | 11/2001 | Liu et al. |
| 6,331,867 B1 * | 12/2001 | Eberhard et al. ........... 715/864 |
| 6,340,980 B1 | 1/2002 | Ho |
| 6,356,287 B1 | 3/2002 | Ruberry et al. |
| 6,369,811 B1 | 4/2002 | Graham et al. |
| 6,370,497 B1 | 4/2002 | Knowles |
| 6,389,434 B1 | 5/2002 | Rivette et al. |
| 6,393,422 B1 | 5/2002 | Wone |
| 6,405,221 B1 | 6/2002 | Levine et al. |
| 6,418,421 B1 | 7/2002 | Hurtado et al. |
| 6,421,065 B1 | 7/2002 | Walden et al. |
| 6,425,525 B1 | 7/2002 | Swaminathan et al. |
| 6,437,793 B1 | 8/2002 | Kaasila |
| 6,446,110 B1 | 9/2002 | Lection et al. |
| 6,457,013 B1 | 9/2002 | Saxton et al. |
| 6,460,058 B2 | 10/2002 | Koppolu et al. |
| 6,484,156 B1 | 11/2002 | Gupta et al. |
| 6,486,895 B1 | 11/2002 | Robertson et al. |
| 6,490,603 B1 | 12/2002 | Keenan et al. |
| 6,529,920 B1 | 3/2003 | Arons et al. |
| 6,535,294 B1 | 3/2003 | Arledge, Jr. et al. |
| 6,539,370 B1 | 3/2003 | Chang et al. |
| 6,549,220 B1 | 4/2003 | Hsu et al. |
| 6,560,621 B2 | 5/2003 | Barile |
| 6,571,211 B1 | 5/2003 | Dwyer et al. |
| 6,571,295 B1 | 5/2003 | Sidana |
| 6,573,907 B1 | 6/2003 | Madrane |
| 6,585,776 B1 | 7/2003 | Bates et al. |
| 6,631,496 B1 | 10/2003 | Li et al. |
| 6,636,238 B1 | 10/2003 | Amir et al. |
| 6,647,534 B1 | 11/2003 | Graham |
| 6,687,878 B1 | 2/2004 | Eintracht et al. |
| 6,697,997 B1 | 2/2004 | Fujimura |
| 6,710,790 B1 | 3/2004 | Fagioli |
| 6,714,214 B1 | 3/2004 | DeMello |
| 6,760,884 B1 | 7/2004 | Vertelney et al. |
| 6,871,318 B1 | 3/2005 | Wynblatt et al. |
| 6,904,450 B1 | 6/2005 | King et al. |
| 2001/0031128 A1 | 10/2001 | Manbeck |
| 2002/0097261 A1 | 7/2002 | Gottfurchi et al. |
| 2002/0194260 A1 | 12/2002 | Headley et al. |
| 2005/0060138 A1 | 3/2005 | Wang et al. |

FOREIGN PATENT DOCUMENTS

| | | |
|---|---|---|
| EP | 0 822 501 A1 | 2/1998 |
| EP | 0 902 379 A2 | 3/1999 |
| WO | WO97/22109 | 6/1997 |
| WO | WO98/06054 | 2/1998 |
| WO | 96/20908 | 7/1998 |
| WO | WO99/49383 | 9/1999 |

OTHER PUBLICATIONS

Graefe et al., "Designing the muse: A Digital Music Stand for the Symphony Musician", pp. 436-440, CHI 96, Apr. 13-18, 1996.

International Search Reports.

Hirotsu et al., "Cmew/U—A Multimedia Web Annotation Sharing System", NTT Network Innovation Laboratories—Japan, IEEE, 1999, pp. 356-359.

Kuo et al., "A Synchronization Scheme for Multimedia Annotation", Multimedia Information Networking Laboratory, Tamkang University—Taiwan, IEEE, 1997, pp. 594-598.

Greenberg, Saul, "A Fisheye Text Editor for Relaxed-WYSIWIS Groupware", Chi 1996 Proceedings, pp. 1 to 5.

Marshall, C., "Annotation from paper books to the digital library," ACM International Conf. on Digital Libraries, 1997, pp. 131-140.

"Joke eBook," Jul. 1998, PrimaSoft PC, Inc., Electronic Book Series Version 1.0, pp. 1-5.

Munyan, D., "Everybook, Inc: Developing the E-Book in Relation to Publishing Standards," Sep. 1998, http://www.futureprint.kent.edu/articles/munyan01.htm, pp. 1-7.

PhotoImpact 3.0, Ulead Systems Inc., 1996.

Landay et al., "Making Sharing Pervasive: Ubiquitous Computing for Shared Note Taking," IBM Systems Journal, vol. 38, No. 4, 1999, pp. 531-550.

Landay, J. A., "Using Note-Taking Appliances for Student to Student Collaboration," 29th Annual Frontiers in Education Conference, IEEE Computer Society, Nov. 1999, p. Session 12C4/15-12C4/20.

Adobe Acrobat 3.0 Review, downloaded from <http://www.hmug.org/Reviews/>, reviewed Mar. 1997, pp. 1-18.

"Adobe Acrobat 3.0 Reader Online Guide", Adobe Systems, Inc. pp. 1-110.

Kunikazu, T., Patent Abstracts of Japan, Publication No. 11327769 for Color Display and Electronic Blackboard System, published Nov. 30, 1999.

Open eBook Forum, Open eBook™ Publication Structure 1.0, http://www.ebxwg.org/oebps/oebps1.0/download/oeb1-oebps.htm.

Kristensen, A, "Formsheets and the XML Forms Language" (Mar. 1999).

Dublin Core Resource Types: Structurality Draft: Jul. 24, 1997, Feb. 27, 1998.

Dublin Core Metadata Element Set, Version 1.1: Reference Description 1999.

Dublin Core Metadata Initiative: User Guide Working Draft Jul. 31, 1998 1999.

SoftBook®Press, The Leader in Internet-Enabled Document Distribution and Reading Systems; http://www.softbook.com/consumer/reader.asp.

Rocket eBook Using the Rocket eBook:http://www.rocketbook.com/Products/Faq/using.html.

Explore the Features of the Rocket eBook; wysiwyg://212http://www.rocketbook.com/Products/Tour/index.html.

Computer Networks and ISDN Systems "Responsive Interaction for a large Web application: the meteror shower architecture in the WebWriter II Editor", pp. 1508-1517.

* cited by examiner

SYSTEM, METHOD AND USER INTERFACE FOR ACTIVE READING OF ELECTRONIC CONTENT

1. CROSS-REFERENCE TO RELATED APPLICATIONS

This application is a divisional application of U.S. patent application Ser. No. 09/455,808 filed Dec. 7, 1999 now U.S. Pat. No. 6,714,214 which is hereby incorporated by reference.

This application is related to the following applications:

U.S. Ser. No. 09/456,127, filed Dec. 7, 1999, entitled "Bookmarking and Placemarking a Displayed Document in a Computer System;"

U.S. Ser. No. 09/455,754, filed Dec. 7, 1999, "Method and Apparatus for Installing and Using Reference Materials In Conjunction With Reading Electronic Content;"

U.S. Ser. No. 09/455,805, filed Dec. 7, 1999, entitled "System and Method for Annotating an Electronic Document Independently of Its Content;"

U.S. Ser. No. 09/455,806, filed Dec. 7, 1999, entitled "Method and Apparatus For Capturing and Rendering Annotations For Non-Modifiable Electronic Content;" and, U.S. Ser. No. 09/455,807, filed Dec. 7, 1999, entitled "Method and Apparatus for Capturing and Rendering Text Annotations For Non-Modifiable Electronic Content."

2. BACKGROUND

A. Technical Field

The disclosure generally relates to the electronic display of documents. More particularly, the disclosure relates to a user interface for use with viewing electronically displayed documents.

B. Related Art

Many factors today drive the development of computers and computer software. One of these factors is the desire to provide accessibility to information virtually anytime and anywhere. The proliferation of notebook computers, personal digital assistants (PDAs), and other personal electronic devices reflect the fact that users want to be able to access information wherever they may be, whenever they want. In order to facilitate greater levels of information accessibility, the presentation of information must be made as familiar and comfortable as possible.

In this vein, one way to foster success of electronic presentations of information will be to allow users to handle information in a familiar manner. Stated another way, the use and manipulation of electronically-presented information may mimic those paradigms that users are most familiar with, e.g., printed documents, as an initial invitation to their use. As a result, greater familiarity between users and their "machines" will be engendered, thereby fostering greater accessibility, even if the machines have greater capabilities and provide more content to the user beyond the user's expectations. Once users feel comfortable with new electronic presentations, they will be more likely to take advantage of an entire spectrum of available functionality.

Paper books have a simple user interface. One opens a book and begins to read it. If a user wants to do something to the book (for example, add a textual annotation), he may use a pen or pencil to add a notation in the margin next to a relevant passage of the book. Here, the objects presented to the user include the paper page of the book with two regions (the margin and the text on the page itself) and the writing implement. Other types of actions are also available including bookmarking the page (for example, by folding over the top corner of the page), adding a drawing (using the same pen or pencil discussed above), and highlighting a passage (with a pen or pencil of different color). With these simple objects and tools, a user is able to interact quickly and easily with the pages of the book, creating an environment of active reading with a transparent user interface. Here, for example, a user concentrates on the text, not on the highlighter or pen in her hand when actively reading and annotating (adding a note or highlighting, for instance) the text.

The transition of active reading from the paper environment to the electronic book environment has not projected the same transparent user interface. Rather, electronic documents commonly provide a user interface where one selects an action from a tool bar located at the top of a display (for example, turns on a highlighting tool) then selects the object. This sequence of actions can become cumbersome when switching between actions. For instance, switching between adding a text annotation to adding a drawing requires moving a user's hand (or other cursor designating device) from the text area to the tool bar (step 1), selecting the drawing tool (step 2), moving the user's hand back to the text area (step 3), then selecting the object to be annotated (step 4). This number of steps can be compounded if a mistake is made. For example, the user intends to select the drawing tool, but instead selects the highlighting tool. The user then has to move back to the tool bar (step 5), select the correct tool (step 6), move back to the text area (step 7), then select the object to be annotated (step 8). For large displays, the distance one needs to control the cursor to travel is distracting. Importantly, for stylus-controlled input devices, this large distance translates into significant hand or arm movement that requires the user to change the focus of his attention from the text to be annotated to precise navigation over an extended distance. Performed many times, this change in attention may become a significant distraction and eventually force the user to refrain from actively reading a document or book.

While some electronic document editors include the option to display a list of menu items based on a right mouse click over selected text, this option is not readily apparent to all users. One needs to become familiar with a windowing, operating environment prior to learning about this feature. In short, because the right mouse button is a lesser know interface, any listing of options based on the operation of the right mouse button is not intuitive. To most users then, the use of this interface is not known and all advantages that may be potentially available for the users will remain a mystery. To this end, despite the programmers' efforts to the contrary, all benefits that remain shrouded behind the right mouse click are as if they never existed.

3. SUMMARY

The present invention provides a technique for allowing a user to interact with the electronic display of documents with a simple user interface. Through use of the interface, a user experiences immediate gratification in response to selection of an object or objects. In a first embodiment, a selection of an object results in a display of a list of menu items relevant to the selected object. The user interface for the object is determined based on the type of object selected. Instead of displaying a general user interface for all potential selectable objects, the user interface is tightly associated with the selected object. Through being customized for the selected object (word, margin, page number, title, icon, equation, or the like), the user interface is quick, simple, and unobtrusive. In one embodiment, the goal associated with the user interface includes being functionally transparent to the user. The present application also relates to the mechanism underlying the functionality of the display and operation of the user interface.

In the context of the present invention, a "document" or "book" encompasses all forms of electronically displayable information including but not limited to books, manuals, reference materials, picture books, etc. Further, the documents or books may include catalogs, e-commerce publications, articles, web pages, and the like.

"Object" as used herein encompasses all displayed information. With reference to looking up information regarding the object, the object may be a word or a group of words, symbols, icons, reference point on a page, page number, equation, margin, title, title bar, corner of the screen, and the like.

For the purpose of this disclosure, annotations are generally related to textual annotations. However, other annotations that may be used include highlighting, drawings (as one would expect to do with a pencil or pen to a paper book), and bookmarks. While the annotations are to be displayed in conjunction with the document, the underlying document is not modified. Related annotations and techniques for creating them are described in the following disclosures:

U.S. Ser. No. 09/456,127, filed Dec. 7, 1999, entitled "Bookmarking and Placemarking a Displayed Document in a Computer System;"

U.S. Ser. No. 09/455,754, filed Dec. 7, 1999, entitled "Method and Apparatus for Installing and Using Reference Materials In Conjunction With Reading Electronic Content;"

U.S. Ser. No. 09/455,805, filed Dec. 7, 1999, entitled "System and Method for Annotating an Electronic Document Independently of Its Content;"

U.S. Ser. No. 09/455,807, filed Dec. 7, 1999, entitled "Method and Apparatus for Capturing and Rendering Text Annotations For Non-Modifiable Electronic Content;" and, U.S. Ser. No. 09/455,806, filed Dec. 7, 1999, entitled "Method and Apparatus For Capturing and Rendering Annotations For Non-Modifiable Electronic Content" which are incorporated herein by reference in their entireties for any enabling disclosure.

These and other novel advantages, details, embodiments, features and objects of the present invention will be apparent to those skilled in the art from following the detailed description of the invention, the attached claims and accompanying drawings, listed herein, which are useful in explaining the invention.

4. BRIEF DESCRIPTION OF THE DRAWINGS

5. DETAILED DESCRIPTION

The present invention relates to an improved user interface for use with the electronic display and active reading of documents or books.

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

Figure 1:
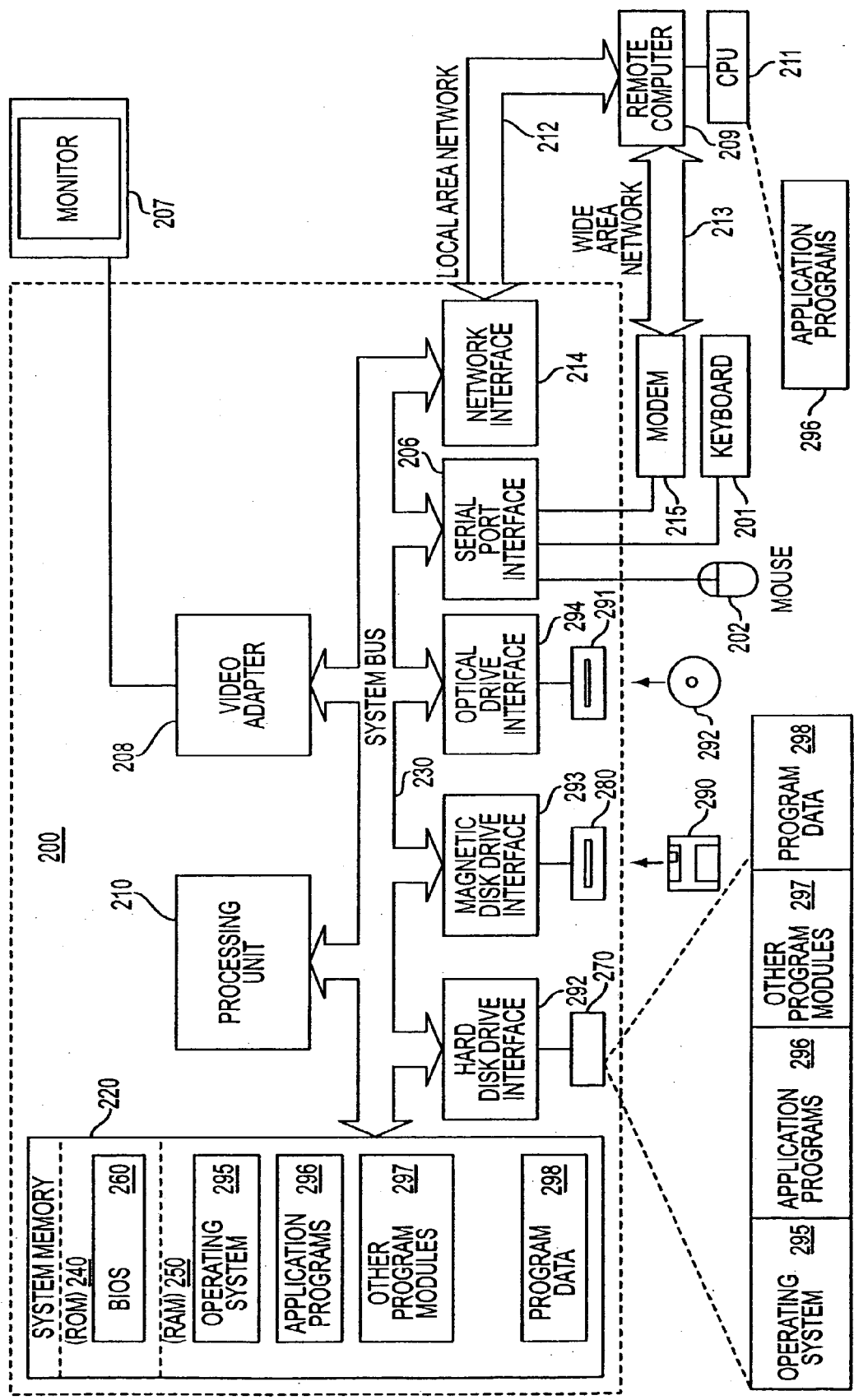
FIG. 1 shows a general purpose computer supporting the display and annotation of an electronic document in accordance with embodiments of the present invention.

FIG. 1 is a schematic diagram of a computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

In addition to the system described in relation to FIG. 1, the invention may be practiced on a handheld computer. Further, purpose-built devices may support the invention as well. In short, handheld computers and purpose-built devices are similar in structure to the system of FIG. 1 but may be limited to a display (which may be touch-sensitive to a human finger or stylus), memory (including RAM and ROM), and a synchronization/modem port for connecting the handheld computer and purpose-built devices to another computer or a network (including the Internet) to download and/or upload documents or download and/or upload annotations. The description of handheld computers and purpose-built devices is known in the art and is omitted for simplicity. The invention may be practiced using C. Also, it is appreciated that other languages may be used including C++, assembly language, and the like.

Figure 2:
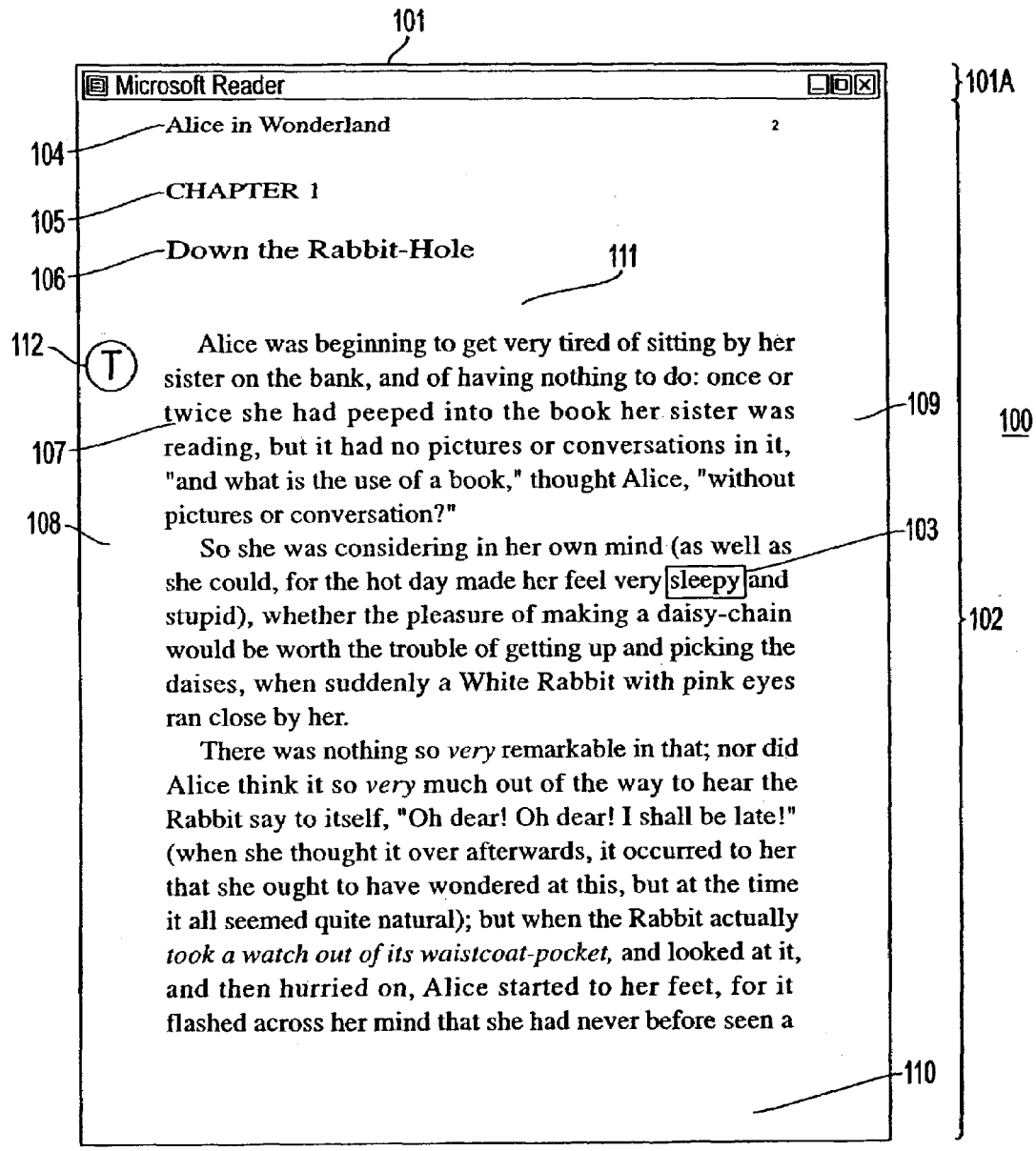
FIG. 2 shows a displayed document on a computer screen in accordance with embodiments of the present invention.

FIG. 2 shows a displayed document on a computer screen in accordance with embodiments of the present invention. As preferred, the document is displayed in a form that closely resembles the appearance of a paper equivalent of the e-book and, in this case, a paper novel. The document reader window 101 may comprise a variety of portions including a title bar 101A listing the title of the document and a body 102. In the body 102 of the display window, various portions of a document may be displayed. FIG. 2 shows an example where a title 104, a chapter number 105, a chapter title 106, and the text of the chapter 107 are displayed. Similar to an actual book, margins 108, 109, 110, and 111 appear around the displayed text. As referred to herein, the displayed elements may be independently referenced. Here, for example object 103 "sleepy" has a drawing annotation placing a box around it as placed there by the user. The presence of icon 112 indicates that a text annotation is present in the line of text adjacent to the icon 112. While the icon 112 is represented as the letter "T" in a circle, it will be appreciated by those of skill in the art that other representations may be used to designate the presence of an annotation. For example, other letters may be used (for instance, the letter "A" for annotation) or other symbols may be used (for instance, a symbol of an open book) or any other representation that indicate that an annotation exists. Tapping on (or otherwise activating) the icon (or other designation) results in the display of a stored annotation. In an environment where a stylus is used to tap directly on a displayed image, the selection of the object provides an environment where the user physically interacts with the displayed image by actually tapping the image of the object itself.

Figure 3A:
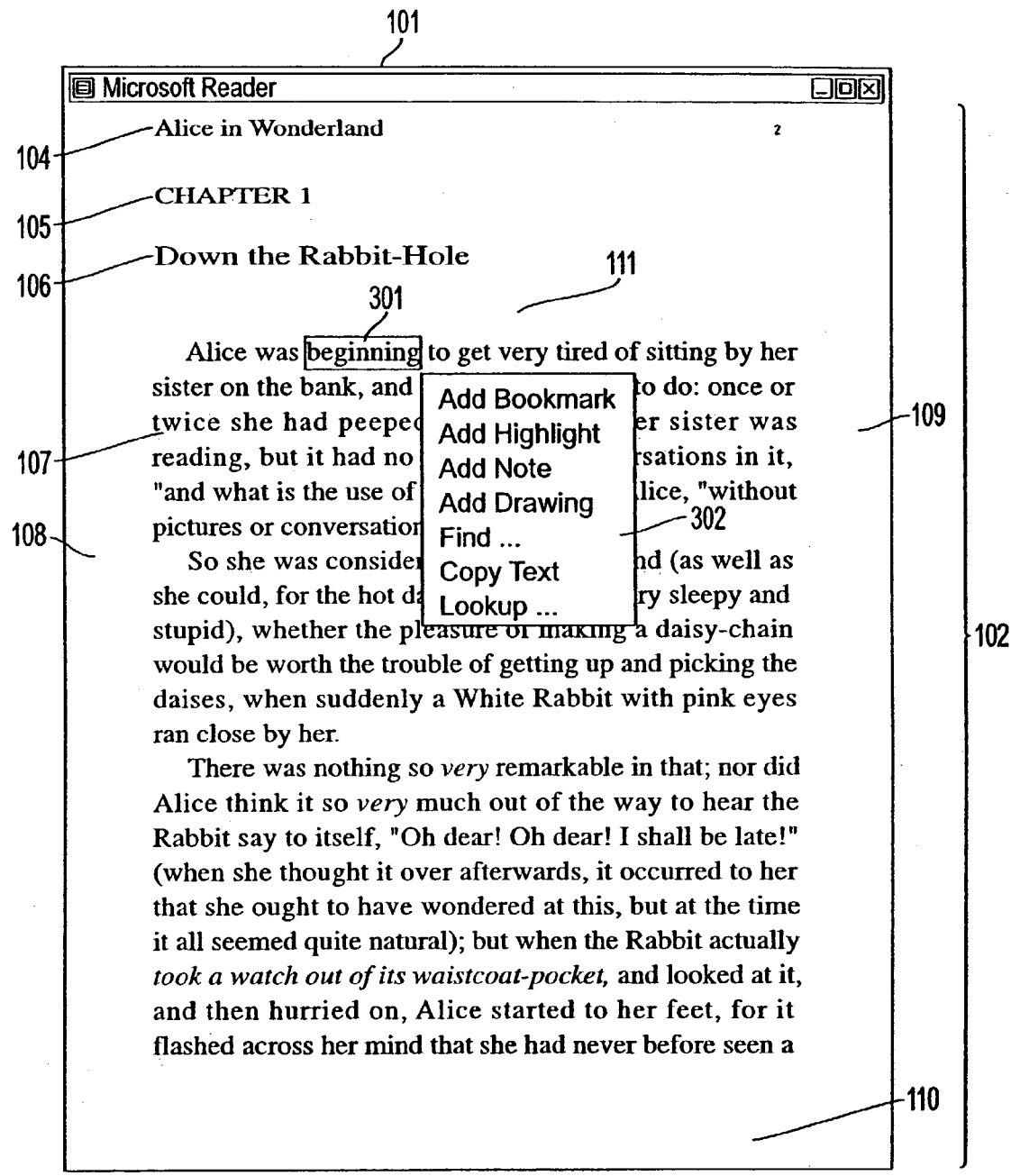
FIGS. 3A and 3B show a displayed document with an object selected in accordance with embodiments of the present invention.

FIG. 3A shows a displayed window after an object has been selected. Here, for example, the object "beginning" 301 in the first line of text 107 was selected. The object may be selected through tapping it with a stylus or a user's finger. Alternatively, a user may position a cursor over the object then select the object (by clicking a mouse button or by operating a designation source). As shown in FIG. 3A, the object may be inverted, meaning that the pixels that make up the object and surrounding pixels are inverted. Alternative embodiments include changing the color of the pixels surrounding the object or highlighting the object in some other way as is known in the art.

In this example of FIG. 3A, a user used a stylus to tap on a display screen. The tap point (the point receiving the tap from the user's stylus) in this example was the center of the second "g" of the selected object 301 (here, the word "beginning").

After an object has been selected, window 302 is displayed close to the physical location of object 301. Window 302 contains actions operable on the selected object. In one embodiment, as shown in FIG. 3A, window 302 is shown close to object 301. By having window 302 close to selected object 301, the user interface minimizes the distance a user needs to move a cursor or pointing device (including stylus or finger tip) from the object to the menu items provided in window 302. A variety of distances and configurations of window 302 may be used. An example includes a showing of the menu options, with the centers of adjacent menu options no more than 0.2 inches apart from each other. Also, the first of the menu options may be displayed no more than 0.3 inches away from the tap point used to select object 301. The distances shown above are merely exemplary and do not limit the scope of the claims. Other examples of values include 0.5 and 1.0 inches, respectively. Again, these values are merely used for example.

Figure 3B:
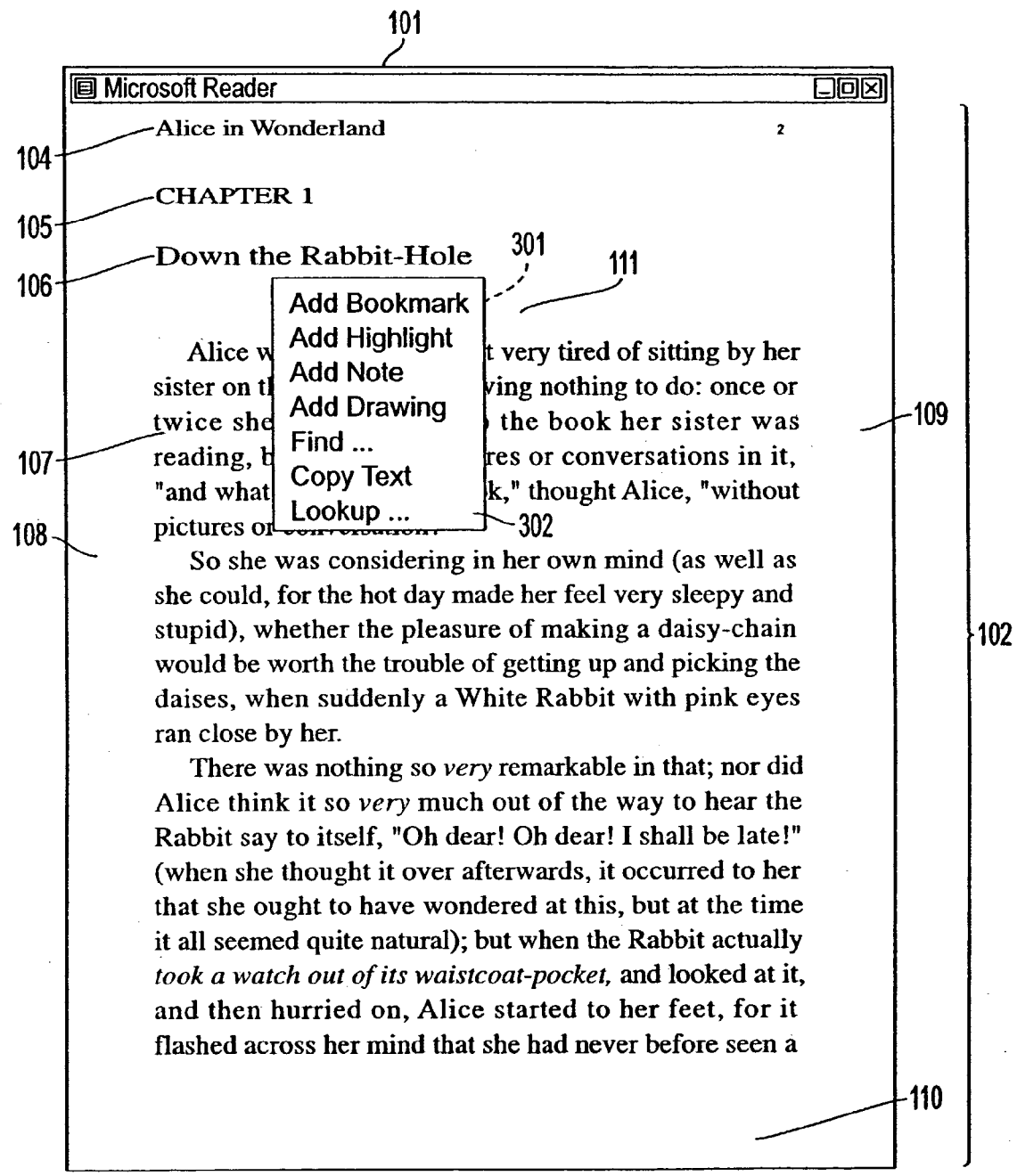

FIG. 3B shows an embodiment where window 302 overlies selected object 301. Overlaying object 301 with the window 302 provides a further minimization of the distance that needs to be traveled by the cursor or pointing device. As shown in FIG. 3B, window 302 is opaque. Selected object 301 is completely hidden. Alternatively, window 302 of FIG. 3B may be semi-transparent and allow a ghost or grayed out image of selected object 301 to show through window 302. Other techniques for projecting the identity of object 301 through window 302 without diminishing the display of menu items in window 302 include projecting selected object with thin lines, italicized font formats, different colors, active shifting colors (for example, the outline of each letter or character of the object being traced with alternating bouncing black and white or shifting colored lines) and the like. An advantage of overlying window 302 over selected object 301 is that the actual distance needed to move between the selected object and the menu items of window 302 is reduced.

The location of window 302 as shown in FIGS. 3A and 3B may be modified to present the user with the most recently selected menu item juxtaposed to the selected object. For example, in FIG. 3A, a user may have previously added a bookmark to the displayed text 107. Remembering this action, the system presents window 302 on selection of object 301 with the menu option of "Add Bookmark" closest to the insertion point. With respect to FIG. 3B, the previous action may have been to add a highlight to the displayed content. Accordingly, the position of the window 302 is modified to position the menu option of "Add Highlight" closest to the insertion point. It is readily appreciated that the window 302 may be positioned so that the text of the last selected menu item (in FIG. 3B, "Add Highlight") does not directly overlie the ghosted image of the selected object 301 to improve readability of the selected object 301.

Here, the events as shown in FIGS. 3A and 3B are based on the primary input function including a left mouse click or a single tap of a stylus, among other things. The primary input function becomes the initial operational interface device revealed to the user. So, when a user first initiates a document active reading system as described herein, the options available through window 302 will become readily apparent with the first selection of an object 301. Moreover, the same movement (i.e., tapping object 301) controls both the pointing to and selection of the object. Visual feedback occurs immediately at or near the selection. The As represented in FIGS. 3A and 3B, the following options are displayed:

Add Bookmark

Add Highlight

Add Note

Add Drawing

Find . . .

Copy Text

Lookup . . .

These options as provided in window 302, in conjunction with object 301, present two types of feedback in response to a user selection. Here, both highlighting of the object 301 and presentation of the list of choices (the menu in window 302) occur based on the single user selection (tapping or clicking) of object 301. Various aspects of the actions associated with these menu options are treated in greater detail in the following disclosures, U.S. Ser. No. 09/456,127, filed Dec. 7, 1999, entitled "Bookmarking and Placemarking a Displayed Document in a Computer System;"

U.S. Ser. No. 09/455,754, filed Dec. 7, 1999, entitled "Method and Apparatus for Installing and Using Reference Materials In Conjunction With Reading Electronic Content;"

U.S. Ser. No. 09/455,805, filed Dec. 7, 1999, entitled "System and Method for Annotating an Electronic Document Independently of Its Content;"

U.S. Ser. No. 09/455,807, filed Dec. 7, 1999, entitled "Method and Apparatus for Capturing and Rendering Text Annotations For Non-Modifiable Electronic Content;" and, U.S. Ser. No. 09/455,806, filed Dec. 7, 1999, entitled "Method and Apparatus For Capturing and Rendering Annotations For Non-Modifiable Electronic Content" which are incorporated herein by reference for any essential disclosure.

Alternatively, window 302 may also include options that may affect the display of the content as well. For example, window 302 may include menu options that allow for switching from one book to another. An advantage of displaying more information to the user may include a net reduction in the number of navigation steps required to perform a process. For example, by providing a menu option to allow one to change which book is currently being displayed, a user may switch between books with a few navigational commands. However, the total options available to a user at any given may be substantial. Due to the overcrowding of window 302, displaying all options decreases the intuitive nature of adding an annotation to a page.

As shown in FIGS. 3A and 3B, the number of options available to the user are limited. By providing a limited number of options, the menu quickly becomes tailored to the intention of the user. By minimizing the actions displayed to the user, the desire is to provide pure functionality to the user without cluttering the user's reading space.

Further, as shown in FIGS. 3A and 3B, the size of the font as displayed in text 107 may be different from that displayed in window 302. For example, the size of the font used for text 107 may be a 14-point font. The size of the font used for the menu items in window 302 may be an 18-point font. Thus, based on user selection of an object 301, the choices available (menu options in window 302) are displayed in a larger font and close to the selection 301. The resulting user interface will be easier to operate based on an analysis of the interface using Fitt's Law. Fitt's Law defines an index of difficulty for human responses as $ID=(\log_2(2A/W))$ where A is the amplitude or size of a movement and W is the width of a target. Fitt's Law indicates that movement time=a+b (ID) where a and b are constants. Here, the smaller the movement and the larger the target, the smaller the index of difficulty. More information regarding Fitt's Law may be found at http://psych.hanover.edu/classes/hfnotes2/sld041.html.

At least in one embodiment, the present invention improves the user interface presented to the user by minimizing the distance traversed to select a menu option as well as increases the size of the target area (for example, by increasing the font size) of the menu options.

Figure 4:
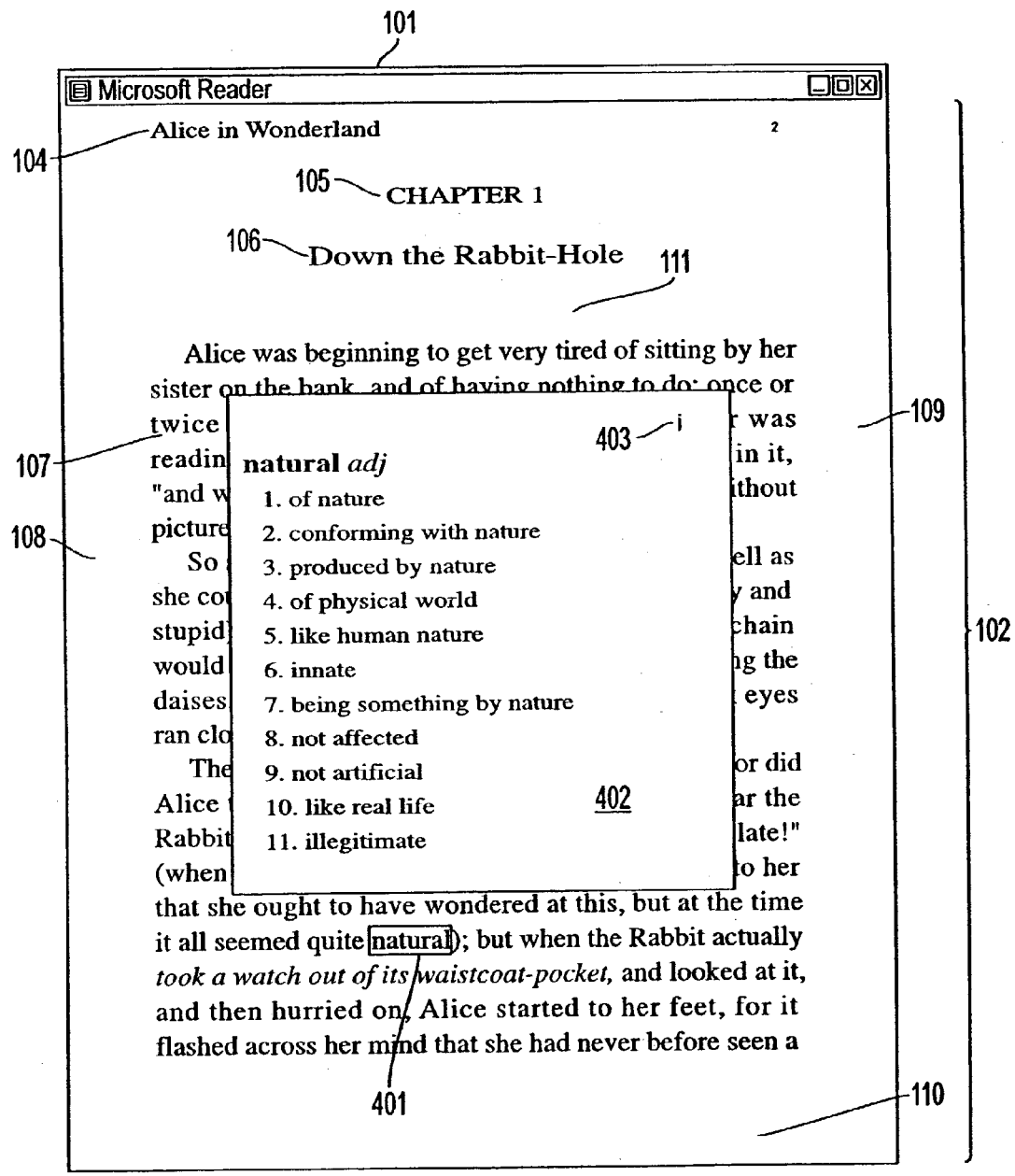
FIG. 4 shows a displayed document with a first reference window in accordance with embodiments of the present invention.
Figure 5:
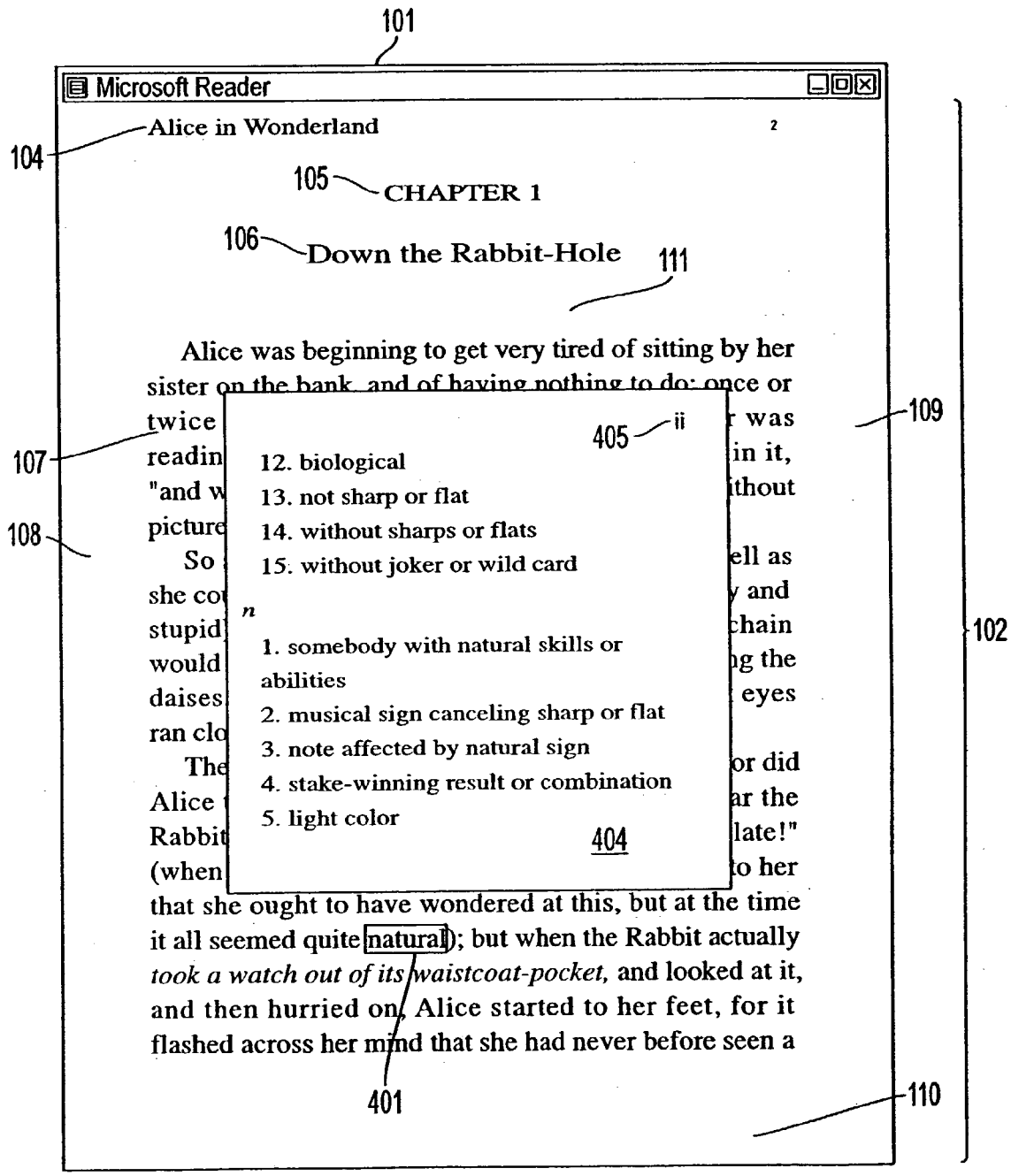
FIG. 5 shows a displayed document with a second reference window in accordance with embodiments of the present invention.

FIGS. 4 and 5 show further examples of the present invention with respect to display portions. FIG. 4 shows a reference window 402 having been opened based on the selection of object 401 (here, the word "natural") and the "Lookup . . ." option (from FIG. 3, window 302). Reference window 402 displays the results of looking up a definition for the word "natural." In the example, of FIG. 4, only one reference document was consulted as only one document may have been installed in conjunction with the lookup functionality. As shown here, where only one reference exists, the system may skip directly to the sole reference, rather than displaying to the user a choice of only one item. If multiple reference documents have been installed with the lookup functionality, then multiple choices relating to the documents installed may be available for the user for selection. In an alternative embodiment, a user may also be given the option of editing the form of the selected object (for lookup purposes).

FIG. 4 also shows the page number "i" as 403. In one embodiment, the page number is always displayed in order to provide the user with standard window appearance for reference window 402. In another embodiment, the page number 403 may be omitted where there is only enough information to fill one reference window 402 and included where there is more information than space available in a single window 402.

FIG. 5 shows an example of a second page of uncovered reference information relating to the object "natural." The second page of reference information is shown as reference window 404 with page number 405. It will be appreciated that changing from reference window 402 to reference window 404 may or may not involve navigating to a new window. If multiple windows are employed, each reference window (402, 404) may overlie one another. Alternatively, they may be cascaded allowing a user to jump pages by selecting new windows. Further, there may only be a single reference window 402 with different content displayed therein with the content being altered only to display additional information regarding the selected object or on navigation to display new information for a newly selected object.

Figure 6:
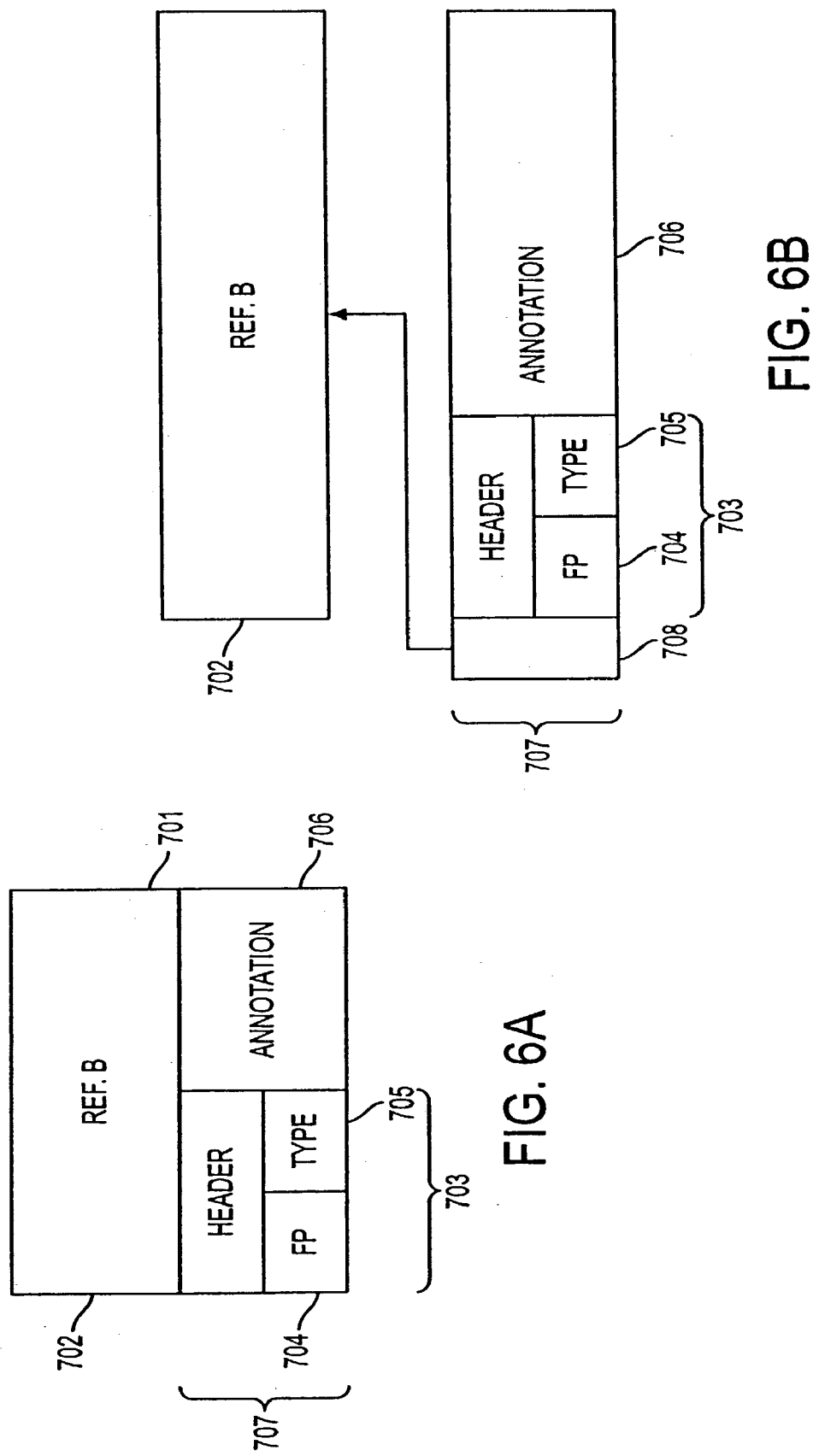
FIGS. 6A and 6B show two file formats for annotations in accordance with embodiments of the present invention.

The menu choices available to users include a number of annotation features. These annotation features can add value to the book. For example, while a textbook alone may not have much value, the textbook with annotations from Albert Einstein or Stephen Hawking may be extremely valuable. However, if one were to purchase a book with annotations, one would not readily want to modify the purchased book (at least for copyright concerns) based on his own annotations or other active reading activities. At least one aspect of the present invention allows users the freedom to read actively a displayed text without the burden of contemplating how one is modifying the underlying document. Here, the user may be shielded from modifying the underlying document by having all annotations added to separate document or to a modifiable portion of the document apart from the displayed, non-modifiable portion. FIGS. 6A and 6B described how annotations may be captured and stored.

FIGS. 6A and 6B show various storage techniques for storing annotations in accordance with embodiments of the present invention. FIG. 6A shows a reference B 701 as having been annotated. The file structure of FIG. 6A has modifiable (703-706) and nonmodifiable (702) portions. Files of this type include Infotext file formats as are known in the art. Annotations 706 may be stored in combination with the non-modifiable content 702. An annotation 706 may be stored in a file with header 703 and body 706. The header 703 includes, for example, the file position 704 of the object with which the annotation 706 is associated. It may also include an indication of the type of annotation 706 in file portion 705. As discussed above, the annotation 706 may include a highlight, a bookmark, a drawing to be overlaid over the object, or a text annotation.

FIG. 6B shows the non-modifiable content of reference B 702 as a separate file apart from the annotation file 707. The annotation file 707 of FIG. 6B has similar constituent elements to that of annotation file 707 of FIG. 6A. Annotation file 707 may include a file portion 708 that indicates to which non-modifiable document (here, 702) it is linked. Using the approach set forth in FIG. 6B, one file may store all annotations for a user with the non-modifiable content portions 702 being stored separately. This approach has the advantage of being able to quickly scan all annotations at one time rather than accessing all documents 701 (as including non-modifiable portions 707 of FIG. 6A) to obtain all annotations stored therein. Greater detail on how to create and store annotations is disclosed in U.S. Ser. No. 09/455, 806, filed Dec. 7, 1999, entitled "Method and Apparatus For Capturing and Rendering Annotations For Non-Modifiable Electronic Content," whose contents are incorporated by reference for any essential disclosure.

Figure 7:
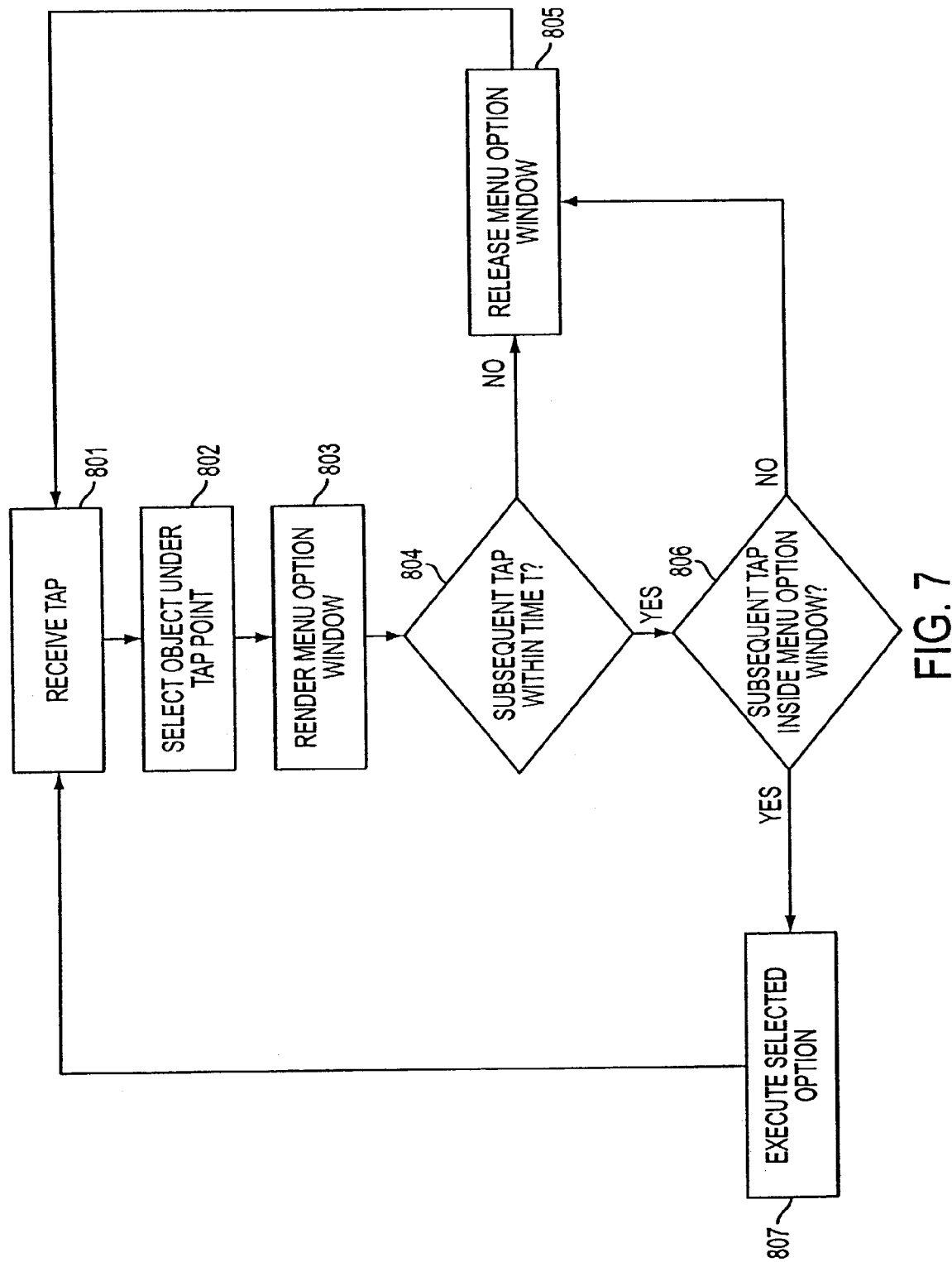
FIG. 7 shows a method for operating a user interface in accordance with embodiments of the present invention.

FIG. 7 shows a method for controlling the display of a user interface in accordance with embodiments of the present invention. FIG. 7 is described with reference to the use of a stylus as an input device for tapping on a computer screen. For the purposes of FIG. 7, a "tap" may be defined as an event defined as a contact with the surface of the display screen and a subsequent release that is near the initial contact point in both time and distance across the surface of the display screen. It will be readily appreciated that a mouse with the operation of the primary mouse button as may be used as well. Starting with step 801, a tap is received. Next, the system selects the object under the tap point of the computer screen as represented by step 802. Menu option window 302 is rendered with options relevant to selected object 301, as shown in step 803. If a timeout interval is in operation, the system determines whether a subsequent tap was received within a given time interval from the initial tap of step 801. If a timeout interval is in operation and if no subsequent tap was received (or was received after time interval T), then the menu option window 302 is released (step 805) and waits for the next tap (step 801). If the subsequent tap was received within time interval T, the system determines whether the subsequent tap was inside the menu option window 302 or outside the menu option window 302 (step 806). If inside the window, the system executes the selected option (step 807). If outside menu option window 302, the menu option window 302 is released and the system waits for the next tap (step 801).

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A computer-implemented method for providing a list of menu options in a system displaying a non-modifiable electronic book comprising the steps of:

receiving a first designation at a first point;

responsive to receiving the first designation, highlighting an object displayed below the first point and displaying a first window containing a first list of menu options related to the object, executing one of the menu options in said first list, and storing an indication of the executed menu option;

receiving a second designation at a second point; and displaying a second window having a second list of menu options including said executed menu option from said first window.

2. The computer-implemented method according to claim 1, wherein said displaying step further comprises the step of:
displaying said executed menu option adjacent to said second point.

3. The computer-implemented method according to claim 1, wherein said displaying step further comprises the step of:
displaying the second list of menu options on top of said second point.

4. The computer-implemented method according to claim 1, further comprising the steps of:
receiving a third designation outside the second window; and,
closing the second window.

5. The computer-implemented method according to claim 1, further comprising the step of displaying said second window so that the executed menu option is the nearest of the second list of menu options adjacent to said second point.

6. The computer-implemented method according to claim 1, wherein at least one of the first designation and the second designation is determined by a stylus tapping a screen of a computer and at least one of said first point and the second point is a tap point designated by said stylus.

7. A user interface for providing a list of menu options in response to a designation of an object in an electronic book comprising:

a first display portion having objects in a non-modifiable portion of a document;

a second display portion having a selection of at least one of said objects;

a third display portion having a list of menu options relevant to said selection, wherein said second and said third display portions are displayed in response to a user interaction with said first display portion, wherein the third display portion includes a previously selected menu option within a predetermined distance to said selection of at least one of said objects, and wherein the third display portion is transparent such that it does not obscure the first display portion and second display portion.

8. The user interface according to claim 7, wherein said second and third display portions are removed upon selection of said first display portion outside the third display portion.

9. The user interface according to claim 7, wherein said predetermined distance ranges from 0.20 inch to 1.0 inch.

10. The user interface according to claim 7, wherein said predetermined distance ranges from 0.30 inch to 0.50 inch.

* * * * *